No. 880,781. PATENTED MAR. 3, 1908.
W. W. DUDLEY, L. A. GREENLEAF & W. R. DUDLEY.
ODOMETER.
APPLICATION FILED JUNE 5, 1906.

3 SHEETS—SHEET 1.

WITNESSES:

INVENTORS:
WILLIAM W. DUDLEY,
LOUIS A. GREENLEAF,
WALLACE R. DUDLEY.
By Russell M. Everett,
ATTORNEY.

No. 880,781. PATENTED MAR. 3, 1908.
W. W. DUDLEY, L. A. GREENLEAF & W. R. DUDLEY.
ODOMETER.
APPLICATION FILED JUNE 5, 1906.

3 SHEETS—SHEET 2.

WITNESSES:

INVENTORS:
WILLIAM W. DUDLEY,
LOUIS A. GREENLEAF,
WALLACE R. DUDLEY,
ATTORNEY.

No. 880,781. PATENTED MAR. 3, 1908.
W. W. DUDLEY, L. A. GREENLEAF & W. R. DUDLEY.
ODOMETER.
APPLICATION FILED JUNE 5, 1906.
3 SHEETS—SHEET 3.
Fig. 3.
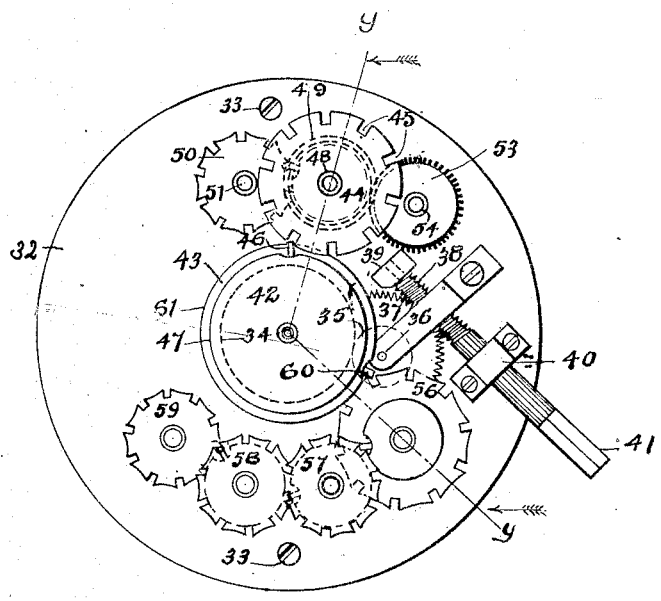
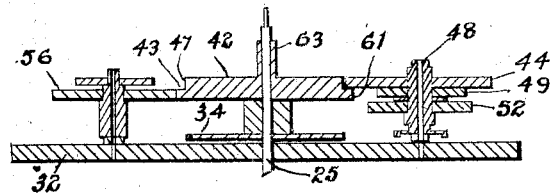
Fig. 4.
WITNESSES:
INVENTORS:
WILLIAM W. DUDLEY,
LOUIS A. GREENLEAF,
WALLACE R. DUDLEY.
ATTORNEY.

UNITED STATES PATENT OFFICE.

WILLIAM W. DUDLEY, OF LANCASTER, PENNSYLVANIA, AND LOUIS A. GREENLEAF AND WALLACE R. DUDLEY, OF TRENTON, NEW JERSEY, ASSIGNORS TO STAR SPEEDOMETER COMPANY, A CORPORATION OF PENNSYLVANIA.

ODOMETER.

No. 880,781.   Specification of Letters Patent.   Patented March 3, 1908.

Application filed June 5, 1906. Serial No. 320,333.

*To all whom it may concern:*

Be it known that we, WILLIAM W. DUDLEY, residing at Lancaster, in the county of Lancaster, State of Pennsylvania, and LOUIS A. GREENLEAF and WALLACE R. DUDLEY, both residing at Trenton, in the county of Mercer and State of New Jersey, all citizens of the United States, have invented certain new and useful Improvements in Odometers, of which the following is a specification.

This invention relates more particularly to such odometers as are employed upon automobiles, and generally used or constructed in combination with a clock, speed-indicator or the like.

The objects of the invention are: First, to secure greater accuracy in the odometer by making the trip record exactly correspond with the permanent or continuous record; to operate the registering mechanism for said records simultaneously, and to provide for this purpose upon a single driving or operating disk independent means arranged at separate points upon the periphery of said disk for operating the said mechanisms. Second, to provide a casing for the odometer which shall also accommodate a clock or time-keeping mechanism; to secure independent chambers for the different mechanisms each of which is accessible independent of the other, and to thus enable either of the mechanisms to be inspected or repaired without disturbing the other. Third, to secure an improved support for the entire casing, so that whether or not the surface to which it be attached is vertical or not the said casing may be brought into its desired position; to secure adjustability of said supporting means so that the position of the odometer may be changed as desired, and to obtain firm and positive locking means for holding the odometer in any given position.

Figure 1:
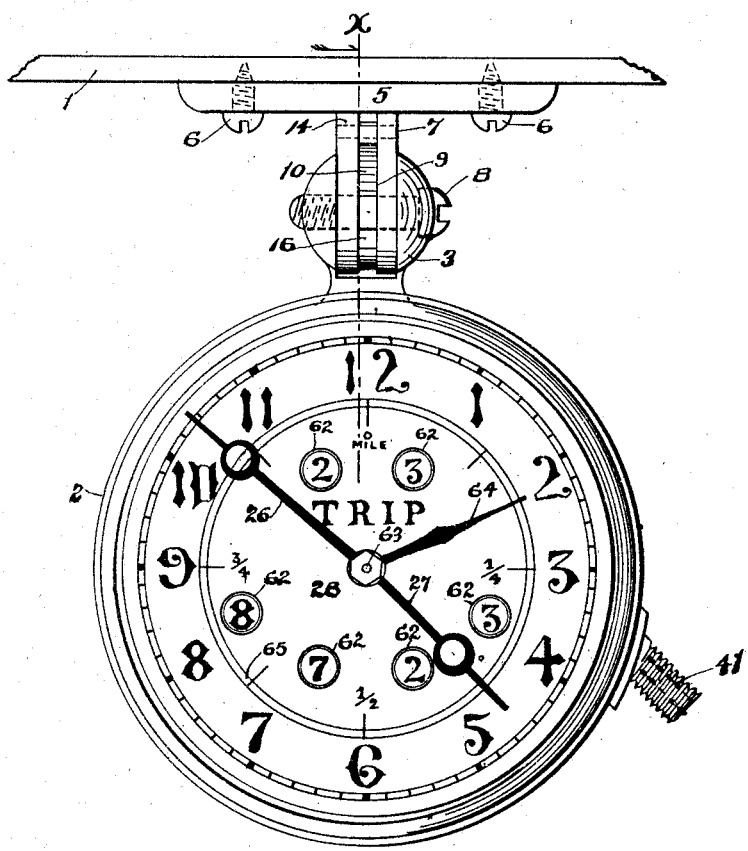
Figure 2:
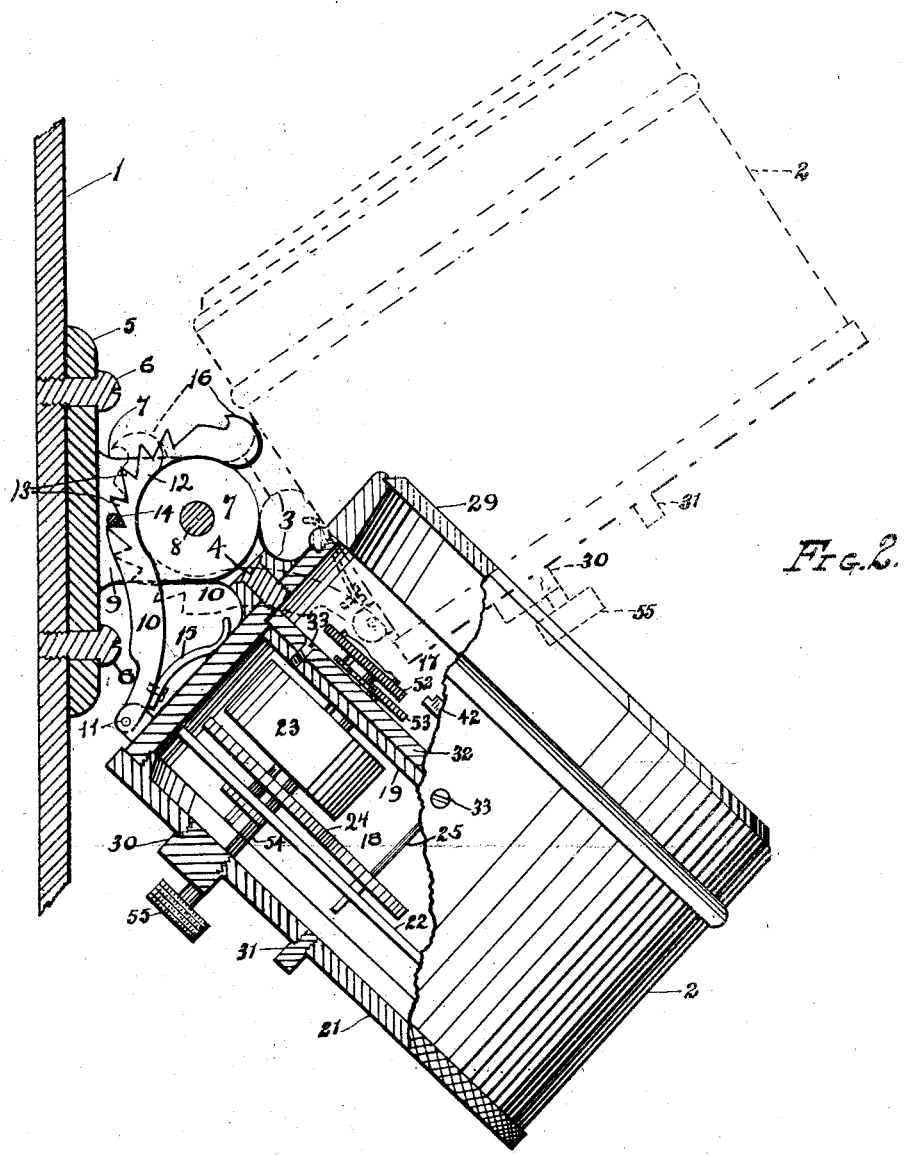

Referring to the accompanying drawings, in which like numerals of reference indicate corresponding parts in each of the several figures, Figure 1 is a plan of my improved device mounted in horizontal position upon a suitable vertical supporting surface; Fig. 2 is a side view of the same partly in section upon line $x$ Fig. 1, and also showing in outline another position of the adjustable casing; Fig. 3 is a plan view of the odometer mechanism and its supporting plate removed from the casing, and Fig. 4 is a sectional view of the same upon line $y$—$y$, Fig. 3, looking in the direction indicated by the arrows.

In said drawings, 1 indicates any suitable surface of an automobile or the like to which an odometer is adapted to be secured, and 2 indicates the casing of my improved device and which is shown as cylindrical with its axial center line adapted to be brought into vertical position. At one side of the said casing the same is provided with an outward bifurcated stem or extension 3 which may be connected to the casing by a screw 4, as shown, or in any other suitable manner. An attaching plate 5 is provided to be secured to the support 1, as by screws 6, and this attaching plate has a projecting tongue 7 to lie between the arms of the bifurcated stem 3 and receive a pivotal pin or screw 8 passed through said parts. This screw lies in horizontal position, with the parts which it connects in vertical plane, so that the casing 2 is adapted to swing vertically up and down as shown in the drawings. The tongue 7 of the attaching plate is also bifurcated or slotted vertically, as at 9, and in said slot between the pivotal pin 8 and the attaching plate 5 is arranged an arm 10 which is connected pivotally at its lower end, as at 11, to the casing 2. The upper part of said arm 10 is suitably curved, as at 12, and provided with a series of upwardly directed teeth 13, adapted to engage a cross-pin 14 arranged in the tongue 7 across its slot 9. A spring 15 upon the lower end of the curved arm 10 is adapted to bear against the casing 2 and normally throw the said arm into engagement with the pin 14. Obviously, therefore, the said arm 10 will serve to prevent down-dropping of the casing upon its hinge and hold the same in any desired vertical position. To adjust the casing to a lower position, it is necessary only to throw the curved arm 10 forward out of engagement with its pin 14 by means of the finger-piece 16 at its top, as will be understood.

The casing 2 is divided transversely into upper and lower chambers 17, 18, respectively, by means of a partition 19 held in place by screws 20 through the walls of the casing or other equivalent means. Underneath this partition, the lower chamber 18 provides a space for the clock work for keeping time, the end of the casing being closed by a screw plate 21. This time-keeping mechanism is of any ordinary construction with its different arbors journaled at one end in the plate 19 and at the other end in a plate 22 held in fixed position with respect to the plate 19, at a point near the lower or open end of the chamber 18. In this clock mechanism, a spring 23 drives through a train of gearing 24 a shaft 25 which extends through the partition plate 19 to the front portion of the upper chamber 17 where the usual hour and minute hands 26, 27, are arranged between a dial 28 and a protecting plate of glass 29. The closing plate 21 of the lower chamber 18, is provided with screw plugs 30 and 31 which may be removed to permit the insertion of keys to wind the spring 23 and to turn the shaft 25 to set the hands of the clock, respectively.

In the upper chamber 17 of the casing 2, is arranged the odometer proper, the various parts of the same being mounted upon a plate 32 adapted to lie flatwise against the partition plate 19, and be secured thereto as by screws 33. At the center of said plate 32, and concentric with the shaft 25, is arranged a gear wheel 34 which is adapted to be driven by pinion 35 mounted upon the same arbor 36 with a worm wheel 37 and which worm wheel is engaged by a worm 38 arranged in bearings 39, 40, upon the plate 32, being adapted at its outer end 41 to receive the coupling of a flexible connection (not shown) which extends to a suitable point to receive the motion of the wheels in rotating, as is usual. Above the said gear wheel 34, and in fixed relation thereto, is a driving disk 42 which has a stepped edge 43, and each peripheral face of which has a radially projecting pin, for the purpose next to be described. The means for keeping record of the number of miles traveled upon a given trip, are located at one side of the said driving disk 42 and comprise a wheel 44 with ten notches 45 in its periphery, each of which is adapted to receive a pin 46 on the upper face 47 of the disk 42, as the same revolves, and thus be turned one notch for each revolution of the disk. The shaft 48 of the notched wheel 44 carries also a lower disk 49 having a pin adapted to engage a second notched wheel 50 upon its shaft 51 and turn the same one notch for every complete rotation of the first wheel, so that units and tens of miles are recorded by the said means. To turn the said trip record means back to starting point at the beginning of a trip, the shaft 48 is provided with a gear 52 adapted to mesh with a second gear 53 upon the end of a shaft 54 extending loosely through the plate 32, partition 19, and end plate 21 of the lower chamber, to carry on the outside thereof a milled finger-piece 55. Normally the gear 53 lies below the plane of the gear 52 so as to be idle with respect thereto, and when the gears are desired to mesh for turning the counter-wheels backward, the finger-piece 55 is pushed inward. At the opposite side of the driving disk 42, from the said trip record means just described, is arranged the means for securing a cumulative record of the entire number of miles traveled by the machine. These means comprise a series of notched counter wheels 56, 57, 58 and 59, the first 56 of which is driven by a pin 60 upon the lower face 61 of the driving disk 42, and in turn drives the second, the second the third, etc., each being upon its own arbor, and their relative arrangement of any approved type.

By my improved construction, it will be noticed that a pin is provided upon the driving disk 42 for each set of recording mechanism adapted to be driven thereby, the relative arrangement of said pins upon the periphery of the disk being such that they engage their respective counter mechanisms at precisely the same moment. There can therefore be no discrepancy between the two records, and at the same time neither pin can affect any other than its own proper recording mechanism because of the stepped edge of the disk 42.

It will be understood that each of the counter wheels carries at its upper side a small disk upon which numerals are arranged to show through apertures 62 in the dial 28, as is common in the art, and that furthermore the driving disk 42 has an upward extension 63 to carry outside of the dial 28 a pointer 64, adapted to indicate thereon, as at 65, fractions of a mile.

Having thus described the invention, what I claim as new is:

1. In a registering device, the combination of the driving disk 42 having a stepped edge providing two circumferential surfaces of different diameters in different planes, radially projecting pins one on each of said circumferential surfaces and at an angular distance apart, means for driving said disk 42, continuous record mechanism having an actuating wheel 56 peripherally notched to receive one of said pins on the driving disk 42 and having between said notches concavities adapted to fit against the circumferential surface from which said pin projects and lock the said actuating wheel, trip recording mechanism having an actuating wheel 44 peripherally notched to receive the other pin on the driving disk 42 and being so located with reference to the said continuous record mechanism actuating wheel 56 as that both said actuating wheels are engaged by their pins simultaneously, said trip counter mechanism actuating wheel 44 being free to turn independent of the driving disk when not engaged by the said pin thereof, a reversing gear 52 on the shaft of said trip record actuating wheel 44, and a sliding gear 53 adapted to engage said reversing gear 52 to turn the trip record mechanism back to starting point.

2. In a registering device, the combination of the driving disk 42 having a stepped edge providing two circumferential surfaces of different diameter in different planes and an intermediate annular surface in the plane of the disk, radially projecting pins one on each of said circumferential surfaces at an angular distance apart, means for driving said disk, and a plurality of counter mechanisms having actuating wheels one in the same plane with each of the said portions of the driving disk and tangent thereto engaging the edge of the driving disk, said actuating wheels each having peripheral notches adapted to receive the said projecting pins on the disk portion with which it is in the same plane and said pins being so disposed as to engage their respective actuating wheel simultaneously.

3. The combination of the cylindrical casing 2 having its walls interiorly and annularly recessed from one of its ends inward to form a radially enlarged end portion and an annular shoulder at the end of said enlargement, a plate 32 seated on said shoulder, a second plate 19 arranged flat against said plate 32 in the small end part of the cylinder, screws extending through said first-mentioned plate into the second, screws extending through the wall of the cylindrical casing into the edge of said second-named plate, odometer mechanism mounted upon said plate 32 and removable therewith, time-keeping mechanism mounted on the other or second plate 19 and removable from the casing therewith, and screw caps one on each end of said casing, whereby either mechanism is accessible independent of the other and either can be removed on its plate without disturbing the other on its plate.

4. In a combined odometer and clock device, the combination of a cylindrical casing, interior transverse partitions arranged flatwise together intermediate of the ends of said casing, screws passing through the wall of said casing into the edge of one of said partitions, other screws passing through one of said partitions into the other one, odometer mechanism mounted upon one of said partition plates and removable from the casing thereupon, time-keeping mechanism mounted on the other partition and removable from the casing therewith, and movable closure caps one on each end of said casing, whereby either mechanism is accessible independent of the other and either can be removed on its plate without disturbing the adjustment of the other on its plate.

5. The combination with an odometer casing having a stem, of an attaching plate having a tongue, a pivotal pin passed through said stem and tongue, a fixed stop, on the said attaching plate, and a locking lever pivoted on the odometer casing and notched to engage said stops and hold the casing in desired position.

6. The combination with a casing having a lateral stem, an attaching plate having a slotted tongue to receive said stem, a horizontal pin through said stem and tongue, a transverse pin in said slotted tongue at a distance from said stem, and a locking lever pivoted on the odometer casing and notched to engage said stops and hold the casing in desired position.

7. The combination with an odometer casing having a stem, of an attaching plate having a tongue, a pivotal pin passed through said stem and tongue, a fixed stop, and a locking lever adapted to engage said stop to hold the casing in desired position.

8. The combination with a casing having a lateral stem, an attaching plate having a slotted tongue to receive said stem, a horizontal pin through said stem and tongue, a fixed stop upon said plate, a locking lever pivoted upon the casing, and a spring normally holding said lever in engagement with said stop.

9. The combination of the casing 2, having a lateral stem at its upper part, an attaching plate having a bifurcated tongue receiving said stem, a pivotal pin passed through said stem and tongue, a stop on said plate, a locking lever pivoted to the lower part of the casing and extending upward through said bifurcated tongue adjacent to said stop, and a spring normally holding said lever in engagement with said stop.

10. The combination of the casing 2, having an upper lateral bifurcated stem, an attaching plate with a bifurcated tongue lying between the arms of said stem, a pivotal pin passed through said stem and tongue, a stop pin extending between the arms of the said tongue between the pivotal pin and body of the attaching plate, a locking lever pivoted to a lower part of the casing and extending upward through the tongue between said two pins and being notched to engage the stop pin, and a spring normally holding said lever in such engagement.

11. The combination of a casing 2, having a lateral stem at its upper part, an attaching plate having a bifurcated tongue receiving said stem, a pivotal pin passed through said stem and tongue and thus connecting the said casing and attaching plate, a stop on one of said last mentioned parts, and a spring-pressed locking-lever pivoted on the other of said parts and having a series of notches to engage the said stop and hold the casing in desired position.

WILLIAM W. DUDLEY.
LOUIS A. GREENLEAF.
WALLACE R. DUDLEY.

Witnesses to William W. Dudley:
WM. R. BRINTON,
S. E. MOORE.

Witnesses to Greenleaf and Wallace R. Dudley:
EDMUND WHITE,
SARAH E. WHITE.